United States Patent
Kitamura et al.

(10) Patent No.: US 8,360,945 B2
(45) Date of Patent: Jan. 29, 2013

(54) AUTOMATIC TOOL STORING MECHANISM

(75) Inventors: Akihiro Kitamura, Takaoka (JP);
  Kosaku Kitamura, Takaoka (JP);
  Takashi Asano, Takaoka (JP)

(73) Assignee: Kitamura Machinery Co., Ltd., Takaoka-shi, Toyama-ken (JP)

( * ) Notice: Subject to any disclaimer, the term of this patent is extended or adjusted under 35 U.S.C. 154(b) by 157 days.

(21) Appl. No.: 13/055,050

(22) PCT Filed: Apr. 20, 2010

(86) PCT No.: PCT/JP2010/057321
§ 371 (c)(1),
(2), (4) Date: Jan. 20, 2011

(87) PCT Pub. No.: WO2010/123135
PCT Pub. Date: Oct. 28, 2010

(65) Prior Publication Data
US 2012/0028771 A1 Feb. 2, 2012

(30) Foreign Application Priority Data

Apr. 22, 2009 (JP) ................................. 2009-104249

(51) Int. Cl.
*B23Q 3/157* (2006.01)
(52) U.S. Cl. ................ 483/65; 483/63; 483/61; 483/37; 483/49; 483/51; 483/53; 483/68
(58) Field of Classification Search .................... 483/61, 483/65, 63, 51, 53, 44, 46, 48, 49, 37, 68
See application file for complete search history.

(56) References Cited

U.S. PATENT DOCUMENTS

| | | | | |
|---|---|---|---|---|
| 4,121,332 A | * | 10/1978 | Corsi | 483/46 |
| 4,459,737 A | * | 7/1984 | Mori et al. | 483/46 |
| 5,797,825 A | * | 8/1998 | Murata et al. | 483/53 |
| 7,635,327 B1 | * | 12/2009 | Liao | 483/37 |
| 7,731,644 B2 | * | 6/2010 | Muser | 483/61 |

FOREIGN PATENT DOCUMENTS

| | | | | |
|---|---|---|---|---|
| JP | 56-157935 A | * | 12/1981 | |
| JP | 61-142038 A | * | 6/1986 | |
| JP | 62-199333 A | * | 9/1987 | |
| JP | 4-38335 | | 3/1992 | |
| JP | 09-248731 A | * | 9/1997 | |
| JP | 2001-038561 | | 2/2001 | |

(Continued)

OTHER PUBLICATIONS

Machine Translation of JP 2002-355729, which JP '729 was published Dec. 2002.*

(Continued)

*Primary Examiner* — Erica E Cadugan
(74) *Attorney, Agent, or Firm* — Bacon & Thomas, PLLC

(57) ABSTRACT

An automatic tool storing mechanism which has a plurality of magazines, a transporting device, and a tool exchanging part. Each magazine holds a number of pots each provided with tools. The transporting device transports tool-mounted pots one by one between the position close to the magazine and the waiting position close to the main spindle. The tool exchanging arm takes out an unused tool from the pot which is waiting at the waiting position and attaches it to the main spindle and also removes the used tool from the main spindle and places it in the pot. (FIG. 3)

9 Claims, 9 Drawing Sheets

FOREIGN PATENT DOCUMENTS

| | | | | |
|---|---|---|---|---|
| JP | 2002-355728 | A | * | 12/2002 |
| JP | 2002-355729 | | | 12/2002 |
| JP | 2003-291046 | A | * | 10/2003 |
| JP | 2004-276161 | | | 10/2004 |
| JP | 2005-103653 | | | 4/2005 |
| JP | 2008-155343 | A | * | 7/2008 |

OTHER PUBLICATIONS

Machine Translation of JP 2004-276161, which JP '161 was published Oct. 2004.*

Machine Translation of JP 2005-103653, which JP '635 was published Apr. 2005.*

* cited by examiner

AUTOMATIC TOOL STORING MECHANISM

BACKGROUND OF THE INVENTION

1. Field of the Invention

The present invention relates to an automatic tool storing mechanism equipped with a magazine to store a large number of tools and pots.

2. Description of the Related Art

Most machine tools, especially machining centers, are equipped with an automatic tool exchanging mechanism, and they recently need a large number of tools and they are provided with more than one magazine to store the increased tools. Each magazine includes a large number of pots which are connected by chains and each pot is provided with a variety of tools.

There is known an automatic tool exchanging device, as disclosed in Japanese Patent Laid-open Nos. 2003-291046 and 2008-155343. It is composed of a magazine holding a large number of tools and pots, means for taking out a tool (held in a particular pot) from the magazine and transporting it to a waiting position, and a tool exchanging arm which exchanges the unused tool (which is waiting at the waiting position) for the used tool (which is attached to the main spindle).

The conventional automatic tool exchanging device is so designed as to take out a selected tool from those which are arranged in the magazine. This action is accomplished by grabbing the tool with claws by its V-shaped flange. The pot from which the tool has been taken out is left in the magazine, and only the tool is transported from the magazine to the waiting position.

According to the conventional method, tool transportation is accomplished by separating a tool from the pot and grabbing it with claws by its V-shaped flange. The disadvantage of this method is that a heavy or long cutting tool is liable to lean during transportation, thereby causing instability in long or fast transportation.

Moreover, the claws need high rigidity to firmly grab the tool by its V-shaped flange.

SUMMARY OF THE INVENTION

It is an object of the present invention to provide an automatic tool storing mechanism which ensures stable tool transportation without tools leaning even in the case of heavy or long cutting tools.

According to a mode of the present invention, an automatic tool storing mechanism comprises: at least one magazine holding a number of pots each provided with tools; transporting means to transport the pot provided with tools one by one between the position close to the magazine and the waiting position close to the main spindle; and a tool exchanging arm to take out an unused tool from the pot waiting at the waiting position and attach it to the main spindle and remove a used tool from the main spindle and place it in the pot.

It is preferable that the transporting means possesses: a guide installed between the magazine-side position and the waiting position close to the main spindle; and pot moving means to move the pot provided with tools along the guide.

Preferably, the guide possesses: a first guide part close to the magazine; and a second guide part which guides the tool-mounted pot between the first guide part and the waiting position.

In addition, it is preferable that the pot moving means possesses: a hydraulic cylinder to move the tool-mounted pot between the first guide part and the magazine; and a ball screw and a servo motor to move the tool-mounted pot.

The pot moving means further preferably possesses a pot moving arm to move the tool-mounted pot between the first guide part and the second guide part.

Also, it is preferable that a plurality of magazines are arranged side by side along the guide for the pot moving arm and which has a means to drive the pot moving arm on the guide for the pot moving arm, such that it stops the pot moving arm at one selected magazine and moves the tool-mounted pot between the magazine and the first guide part, and in which the total number of the pots housed in the magazines is several hundreds.

Preferably, the pot moving arm runs along the guide for the pot moving arm with the help of belts, and possesses claws to grab the pot and claws to grab the tool.

BRIEF DESCRIPTION OF THE DRAWINGS

Embodiments of the present invention will be described in detail based on the following figures, wherein.

DESCRIPTION OF THE PREFERRED EMBODIMENTS

The preferred embodiments of the present invention will be described in more detail with reference to the accompanying drawings.

Figure 1:
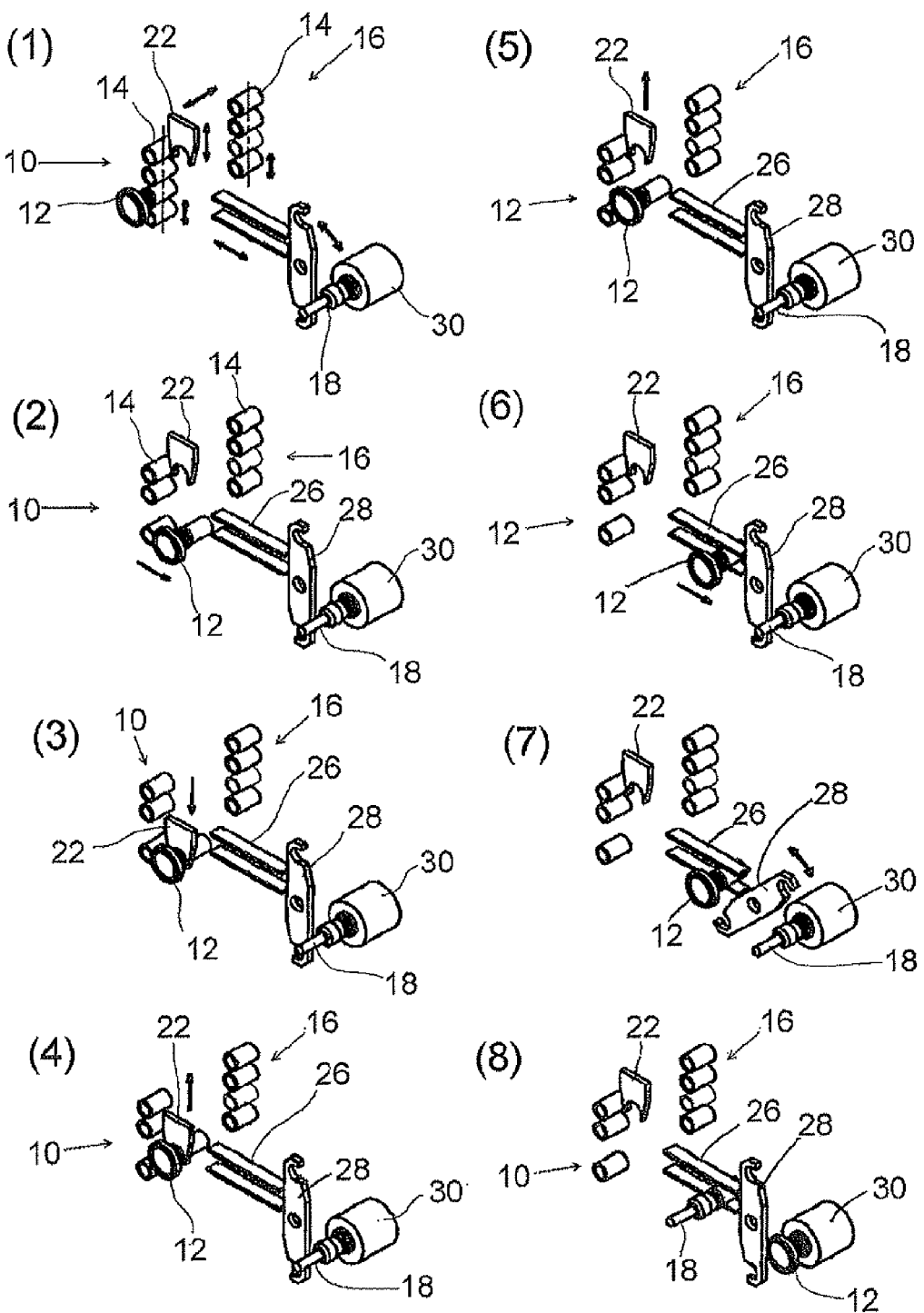
FIG. 1 is a diagram illustrating how the automatic tool storing mechanism according to one example of the present invention transfers the tool and pot from the first magazine to the waiting position.

FIG. 1 is a diagram showing how the automatic tool storing mechanism according to the present invention takes out an unused tool and a pot together from one magazine, transfers them to the waiting position, and exchanges the unused tool for the used tool attached to the main spindle.

Figure 2:
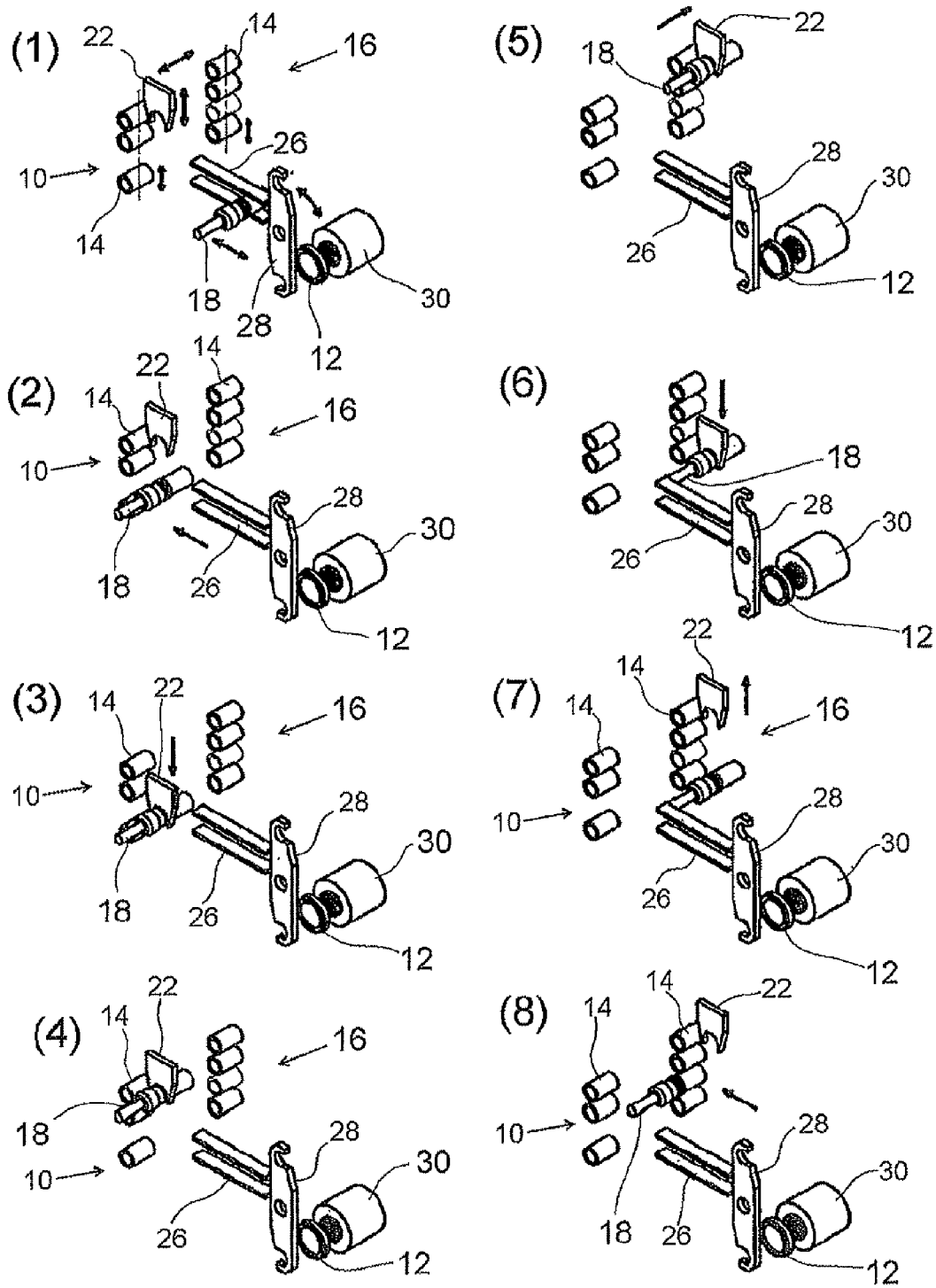
FIG. 2 is a diagram illustrating how the automatic tool storing mechanism shown in FIG. 1 transfers the tool and pot from the waiting position to the second magazine.
Figure 3:
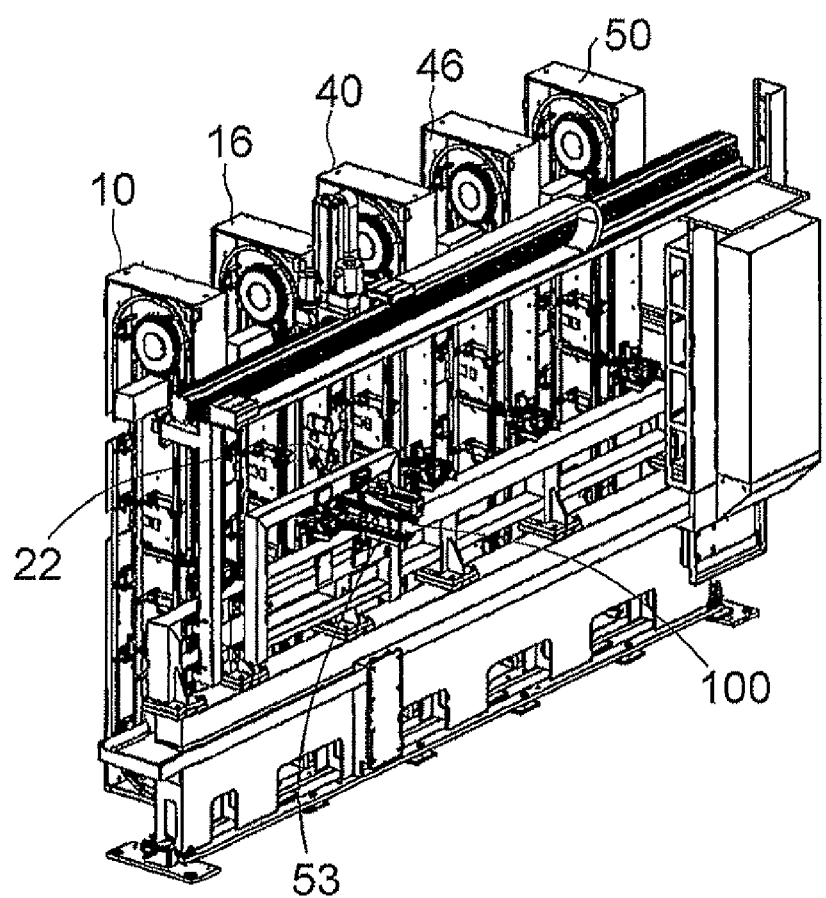
FIG. 3 is a schematic perspective view of the automatic tool storing mechanism according to a preferred example of the present invention.
Figure 4:
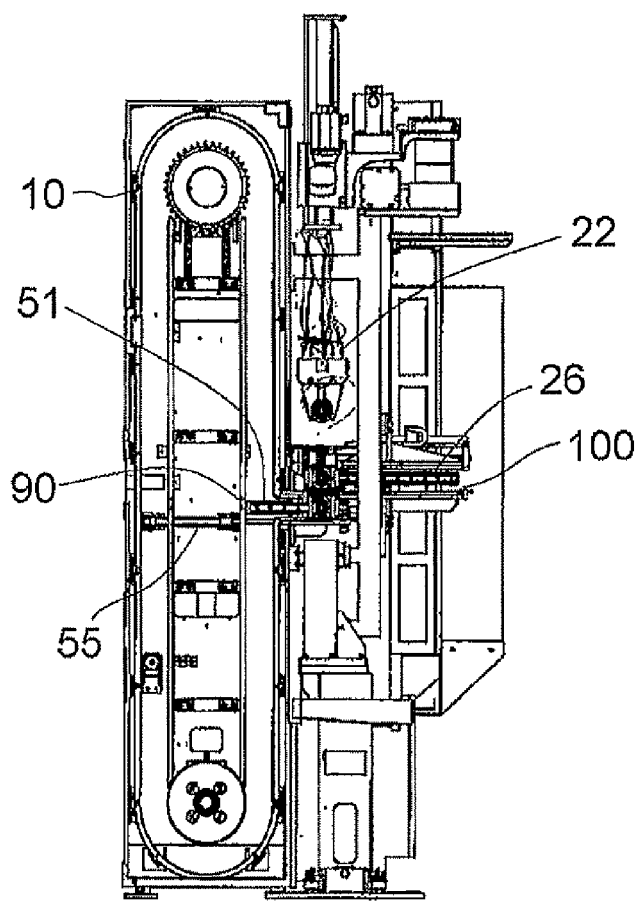
FIG. 4 is a diagram illustrating the relation between one magazine and the transporting means of the automatic tool storing mechanism shown in FIG. 3.

FIG. 2 is a diagram showing how the automatic tool storing mechanism returns, after exchange, the used tool and the pot together to another magazine.

The pot (also called tool pot) is common to all the tools (also called tool holder).

In the embodiments shown in FIGS. 1 and 2, the first magazine 10 stores the tools 12 numbered 1 to 50 and the pot 14. (FIGS. 1 and 2 show only one tool out of 50.) The second magazine 16 stores the tools 18 numbered 51 to 100 and the pot 14. (FIGS. 1 and 2 show only one tool out of 50.) FIGS. 1 and 2 show only the first and second magazines.

FIG. 1(1) shows one example of the initial state. The tool 12 numbered 1, which is stored in the first magazine 10, is called out by the control means (not shown).

In FIG. 1(2), the tool 12 numbered 1 (which has been called out) and the pot 14 for it are taken out together from the first magazine 10. They are transferred rightward in FIG. 1 and positioned under the pot moving arm 22. In FIG. 1(3), the pot moving arm 22 goes down and grabs the tool 12 numbered 1 (by its V-shaped flange) and the pot 14 with its claws.

In FIG. 1(4), the pot moving arm 22 goes up so that the tool 12 numbered 1 and the pot 14 are moved to the entrance of the guide 26.

In FIG. 1(5), the tool 12 numbered 1 and the pot 14, which are held by the claws, remain at the entrance of the guide 26, and only the pot moving arm 22 goes up so that the initial state is restored.

In FIG. 1(6), the tool 12 numbered 1 and the pot 14 are moved together to the waiting position along the guide 26 while they are being held.

In FIG. 1(7), the tool exchanging arm 28 exchanges the unused tool 12 numbered 1 for the used tool 18 numbered 51, which is attached to the main spindle 30.

FIG. 1(8) shows the state in which the tool exchange has been completed.

In FIG. 2(1), the used tool 18 numbered 51 (which has been exchanged) and the pot 14 for it are moved together leftward to the entrance of the guide 26.

In FIG. 2(2), the used tool 18 numbered 51 and the pot 14 are positioned under the pot moving arm 22.

In FIG. 2(3), the pot moving arm 22 grabs the tool 18 numbered 51 (by its V-shaped flange) and the pot 14 with its claws.

In FIG. 2(4), the pot moving arm 22 goes up to its initial position while it grabs the tool 18 numbered 51 (by its V-shaped flange) and the pot 14 with its claws.

In FIG. 2(5), the pot moving arm 22 moves to the position for the second magazine 16 while it is grabbing the tool 18 and the pot 14.

In FIG. 2(6), the pot moving arm 22 goes down to the returning position for the tool 18 numbered 51 in the second magazine 16 while it is grabbing the tool 18 and the pot 14.

In FIG. 2(7), only the pot moving arm 22 goes up, away from the tool 18 and the pot 14, to the position for the initial state.

In FIG. 2(8), the tool 18 numbered 51 is returned, together with the pot 14, to the second magazine 16. As the result, the entire system restores its initial state.

FIGS. 3 to 8 show one example of the automatic tool storing mechanism which has been illustrated in FIGS. 1 and 2.

It has a plurality of magazines (say, five magazines numbered 10, 16, 40, 46, and 50) of the same structure, which are arranged in a line in the longitudinal direction.

Each magazine (10, 16, 40, 46, and 50) is rotatably arranged so that the pots 14, which are common to them, make a circle endlessly. Each pot 14 is provided with a variety of tools 12 and 18 only for illustration in FIGS. 1 and 2).

The total number of the pots 14 that can be stored in all the magazines may be several hundreds (say, 300).

The specific pot 14 provided with the tools 12 and 18 is selected (or called out) by the control device (not shown), and then it is transferred from the position 90 close to the magazine (shown in FIG. 4) to the waiting position 100 close to the main spindle by the transporting means (mentioned later).

The guide for pot transportation is comprised of the first guide part 51 and the second guide part 26. The former, which is close to the magazine, is positioned in front of each magazine, and the latter is positioned between the former and the waiting position 100.

The pot moving means has first driving means and second driving means, and the pot moving arm 22. The first driving means 55 (which is preferably a hydraulic cylinder) moves the pot provided with tools horizontally between the first guide part 51 and each magazine. The second driving means 101 (which preferably includes a ball screw and a servo motor) moves the pot provided with tools horizontally along the second guide part 26. The pot moving arm 22 moves the pot provided with tools vertically between the first guide part 51 and the second guide part 26.

Figure 5:
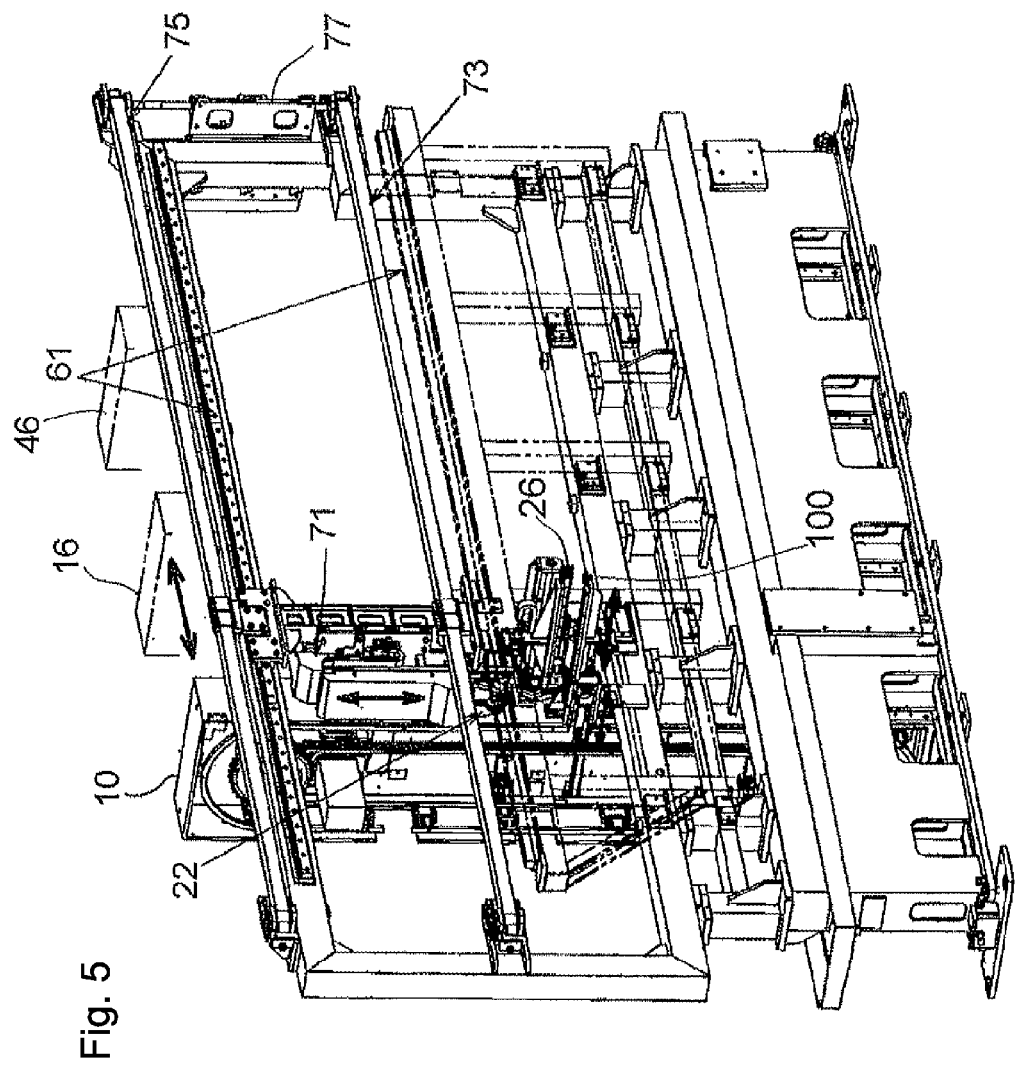
FIG. 5 is a slightly enlarged schematic perspective view of the automatic tool storing mechanism shown in FIG. 3.

As shown in FIG. 5, the automatic tool storing mechanism has the two rail-like guides 61 for the pot moving arm which run parallel horizontally on both sides thereof. Along the guide 61 are arranged in a line other magazines.

The pot moving arm 22 is moved up and down by the vertical driving part 71.

It is moved horizontally to the position of the selected magazine along the two guides 61 for the pot moving arm by the running driving part 77 (which preferably contains a reducer and a servo motor) through the two belts 73 and 75 extending on both side of the automatic tool storing mechanism.

The first guide part 51 is positioned as desired in the longitudinal and lateral directions by the two guides 61 for the pot moving arm and the pot moving arm 22.

Figure 6:
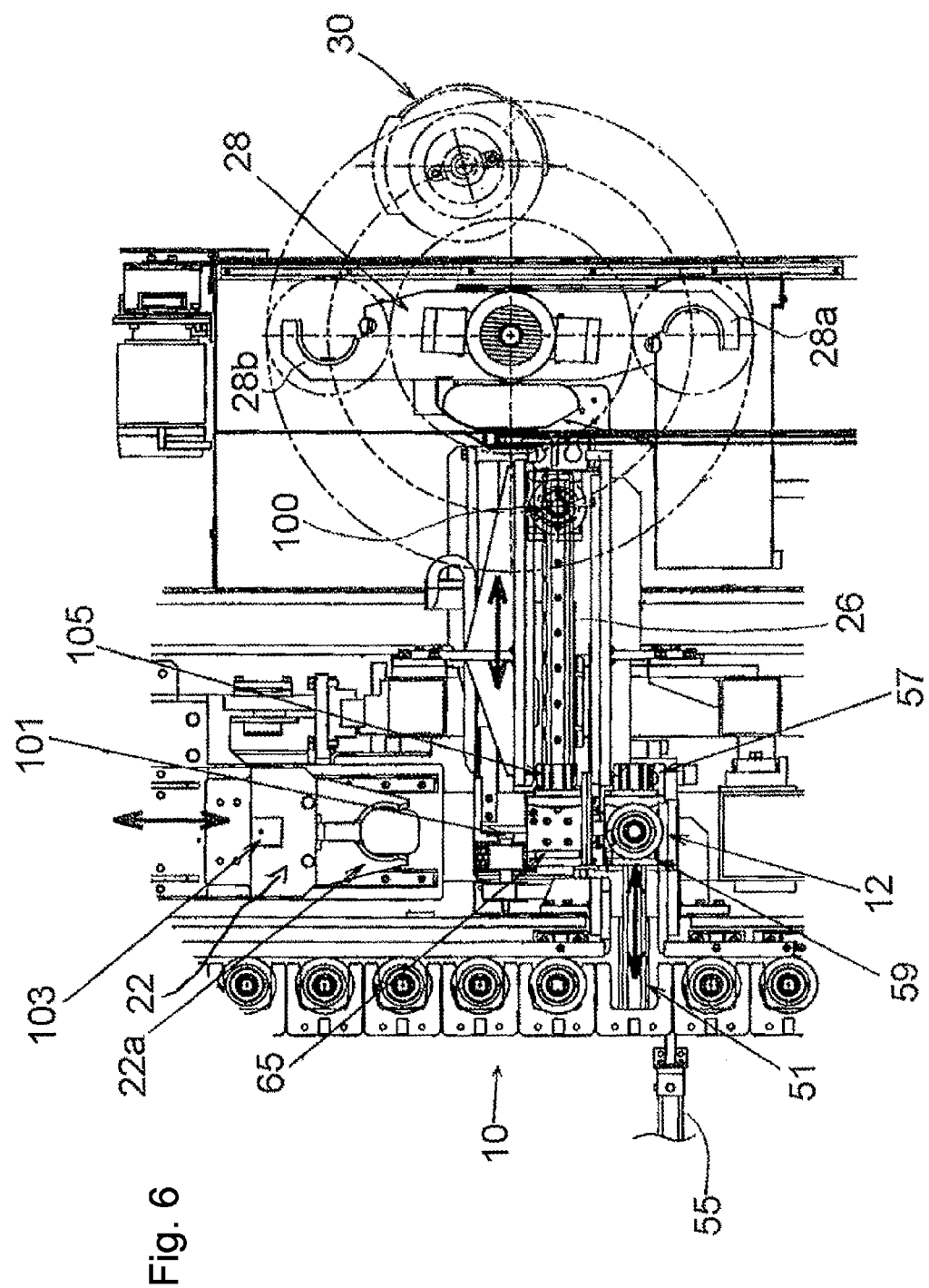
FIG. 6 is a slightly enlarged schematic view of the automatic tool storing mechanism shown in FIG. 3.
Figure 7:
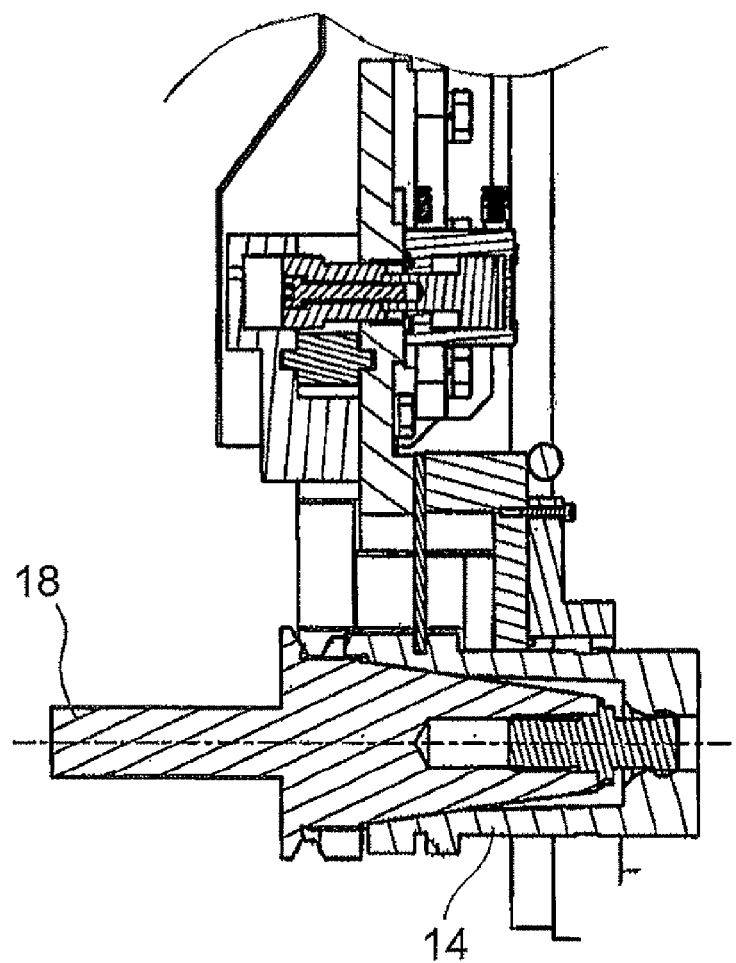
FIG. 7 is a diagram showing the relation between the pot moving arm and the claws and between the tool and the pot in the automatic tool storing mechanism shown in FIG. 3.
Figure 8:
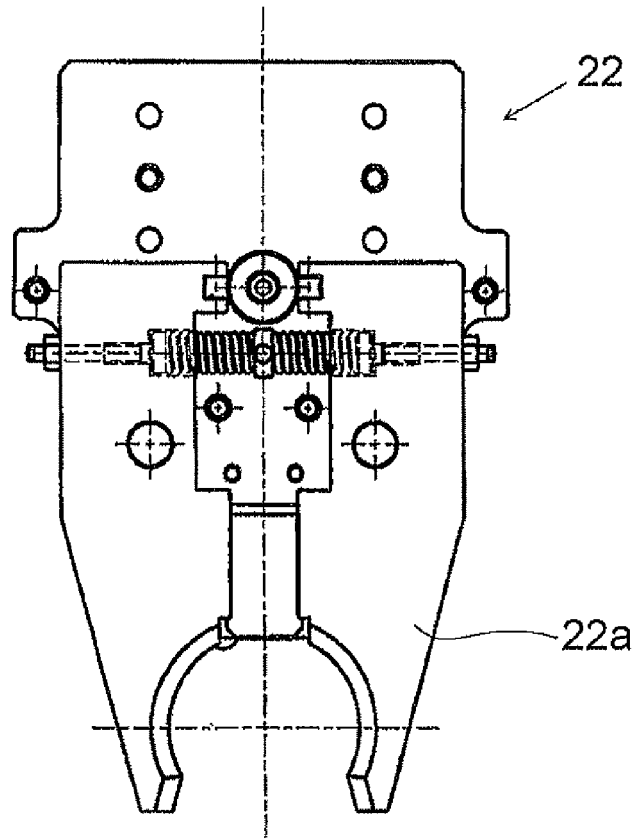
FIG. 8 shows the paired claws of the pot moving arm shown in FIG. 7.
Figure 9:
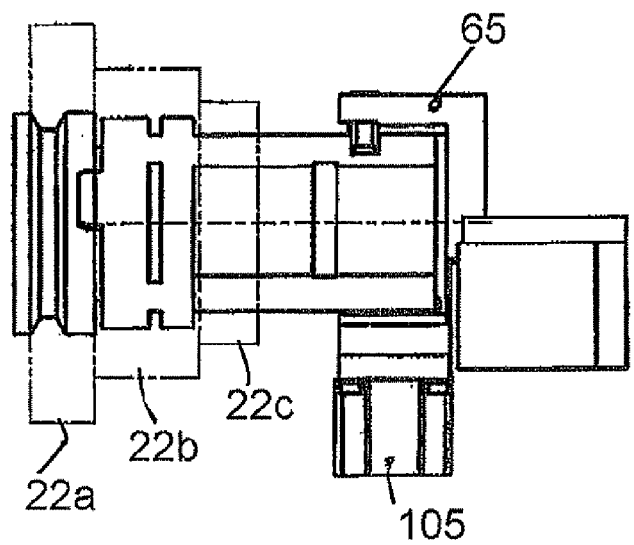
FIG. 9 is a schematic top view showing the three pairs of claws of the pot moving arm shown in FIG. 7.
Figure 10:
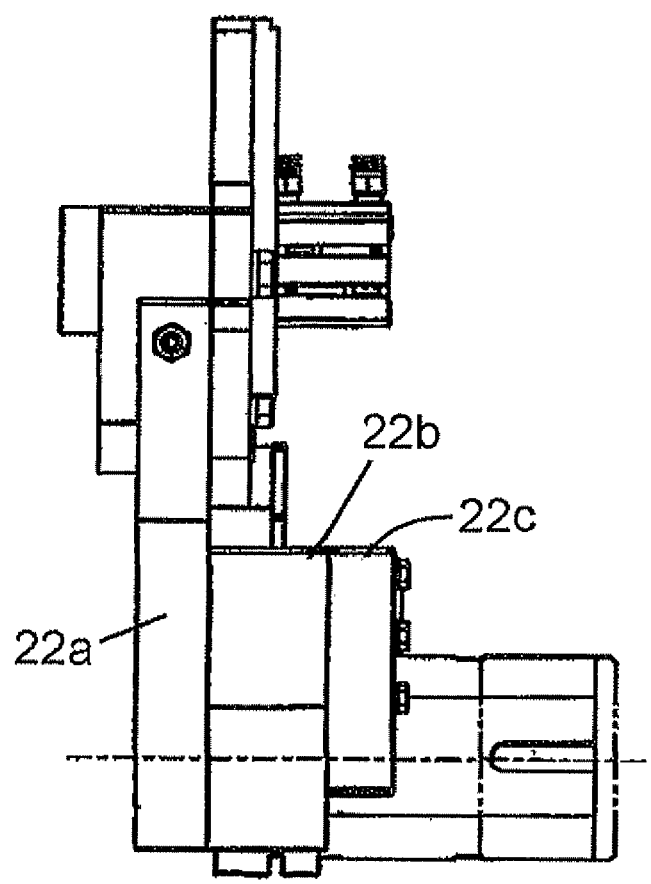
FIG. 10 is a schematic side view showing the three pairs of the pot moving arm shown in FIG. 7.

This is explained with reference to FIG. 6.

Of the many tools stored in the first magazine 10, the tool 12 numbered 1 is selected (called out) by the control device (not shown). The tool 12 numbered 1 and the pot 14 for it are pushed out together from the first magazine 10 by the hydraulic cylinder 55 installed at the pot entrance and exit of the magazine 10. It is transferred rightward (in FIG. 6) along the first guide part 51. At this time, the pot 14 is held by the pot holding part 59 by the action of the pot lock cylinder 57 until the tool 12 numbered 1 and the pot 14 for it reaches the position under the pot moving arm 22.

Then, the pot moving arm 22 is lowered. The V-shaped flange part of the tool 12 numbered 1 is grabbed by the claw 22a and two parts of the pot 14 are grabbed by the claws 22b and 22c.

The symbol 103 denotes the pot lock cylinder to lock and hold the tool and the pot 14 with the claws 22a, 22b, and 22c.

With the pot lock cylinder 103 activated (in its lock state), the pot moving arm 22 is raised and the tool 12 numbered 1 and the pot 14 are moved together to the entrance of the second guide part 26.

At the entrance of the second guide part 26, the pot holding part 65 holds the pot 14 by the action of the pot lock cylinder 105. With the pot 14 held, the pot 14 and the tool 12 contained therein are transferred to the waiting position 100 by the second driving means 101.

After the unused tool 12 numbered 1 and the pot 14 have reached the waiting position 100, the tool exchanging arm 28 is activated. The paired holding parts 28a and 28b turn to exchange the unused tool 12 numbered 1 for the used tool 18 numbered 51 attached to the main spindle 30. In other words, it detaches the tool 12 numbered 1 from the pot 14 and removes the tool 18 numbered 51 from the main spindle 30 and then it turns them through 180° and attaches the tool 12 numbered 1 to the main spindle 30 and places the tool 18 numbered 51 in the pot 14.

The used tool 18 numbered 51 and the pot 14 are transferred to the prescribed magazine along the guide, as shown in FIG. 2. At this time, the pot lock cylinders 103 and 105, the pot moving arm 22, the holding parts 59 and 65, the hydraulic cylinder 55, and others are activated in the order which is reverse to the order in which the pot 14 is transported to the waiting position 100.

According to the above-mentioned embodiments, the tool and the pot are moved together between the magazine and the waiting position 100, and the pot is supported.

What is claimed is:

1. An automatic tool storing mechanism comprising:
   at least one magazine holding a number of pots, each said pot provided with a respective tool;
   transporting means for transporting one of the pots provided with a respective one of the tools, one by one, between a magazine-side position proximal to the at least one magazine and a waiting position distal to the at least one magazine and proximal to a main spindle, the main spindle being spaced from the at least one magazine in a first direction; and
   a tool exchanging arm to take out an unused tool from the one pot when the one pot is waiting at the waiting position and attach the unused tool to the main spindle and remove a used tool from the main spindle and place the used tool in the one pot; and
   wherein the transporting means comprises:
      a pot guide installed between the magazine-side position and the waiting position proximal to the main spindle; and
      pot moving means for moving the one pot provided with a respective one of the tools, called a tool-mounted pot, along the pot guide; and
   wherein the pot guide comprises:
      a first linear guide having a longitudinal axis extending in the first direction, the first linear guide being proximal to the at least one magazine; and
      a second linear guide which guides the tool-mounted pot from the first linear guide to the waiting position, the second linear guide also having a longitudinal axis extending in the first direction, the second linear guide being offset from the first linear guide in a second direction orthogonal to the first direction, the pot moving means being configured to move the tool-mounted pot along the first linear guide in the first direction, to move the tool-mounted pot in the second direction from the first linear guide to the second linear guide at an entry position of the second linear guide, and to move the tool-mounted pot in the first direction from the entry position of the second linear guide to the waiting position.

2. The automatic tool storing mechanism according to claim 1, wherein the pot moving means comprises:
   a hydraulic cylinder to move the tool-mounted pot between the first linear guide and the at least one magazine; and
   a ball screw and a servo motor to move the tool-mounted pot from the entry position of the second linear guide to the waiting position.

3. The automatic tool storing mechanism according to claim 2, wherein the pot moving means further comprises a pot moving arm that is configured to perform the moving of the tool-mounted pot from the first linear guide to the second linear guide.

4. The automatic tool storing mechanism according to claim 1, wherein the pot moving means further comprises a pot moving arm that is configured to perform the moving of the tool-mounted pot from the first linear guide to the second linear guide.

5. The automatic tool storing mechanism according to claim 4, wherein the at least one magazine comprises a plurality of magazines that are arranged side by side along an arm guide for guiding the pot moving arm, and the automatic tool storing mechanism further comprising an arm driving means to drive the pot moving arm on the arm guide.

6. The automatic tool storing mechanism according to claim 5, in which the total number of the pots housed in the magazines is three hundred.

7. The automatic tool storing mechanism according to claim 5, wherein the pot moving arm runs along the arm guide for the pot moving arm with the help of belts.

8. The automatic tool storing mechanism according to claim 7, wherein the pot moving arm comprises claws configured to grab a respective one of the pots and comprises further claws configured to grab the tool mounted in the respective one pot.

9. The automatic tool storing mechanism according to claim 5, wherein the pot moving arm comprises claws configured to grab a respective one of the pots and comprises further claws configured to grab the tool mounted in the respective one pot.

\* \* \* \* \*